United States Patent [19]
Asmus

[11] 3,965,731
[45] June 29, 1976

[54] ROLLER BRAKE TESTER

[75] Inventor: Carl Junior Asmus, Temple City, Calif.

[73] Assignee: Clayton Manufacturing Company, El Monte, Calif.

[22] Filed: Dec. 16, 1974

[21] Appl. No.: 532,817

[52] U.S. Cl. .................................................. 73/126
[51] Int. Cl.² ........................................... G01L 5/28
[58] Field of Search ...................... 73/117, 126, 123

[56] References Cited
UNITED STATES PATENTS

| | | | |
|---|---|---|---|
| 3,180,138 | 4/1965 | Hundley | 73/117 |
| 3,345,865 | 10/1967 | Ostrander | 73/117 |

*Primary Examiner*—Jerry W. Myracle
*Attorney, Agent, or Firm*—Jackson & Jones Law Corporation

[57] ABSTRACT

A roller type brake testing device is disclosed which incudes two pairs of cradling rollers for supporting and applying a driving torque to two wheels of a vehicle such as an automobile. The testing device includes a pneumatic lift mechanism for selectively raising and lowering the rollers which engage the rear portion of the wheels and through which driving torque is applied to the wheels. The brake tester may further include an indicator such as a pressure gauge for displaying a measure of the weight of the axle supporting the vehicle wheels to guide the operator in applying the brakes to achieve a braking effort correlated with axle weight.

12 Claims, 6 Drawing Figures

U.S. Patent   June 29, 1976   Sheet 1 of 3   3,965,731
FIG_1_   PRIOR ART
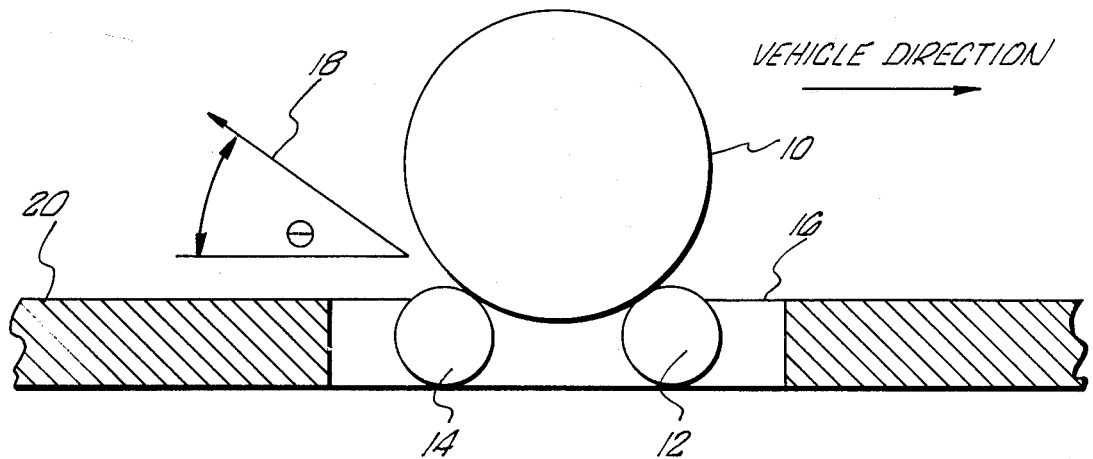
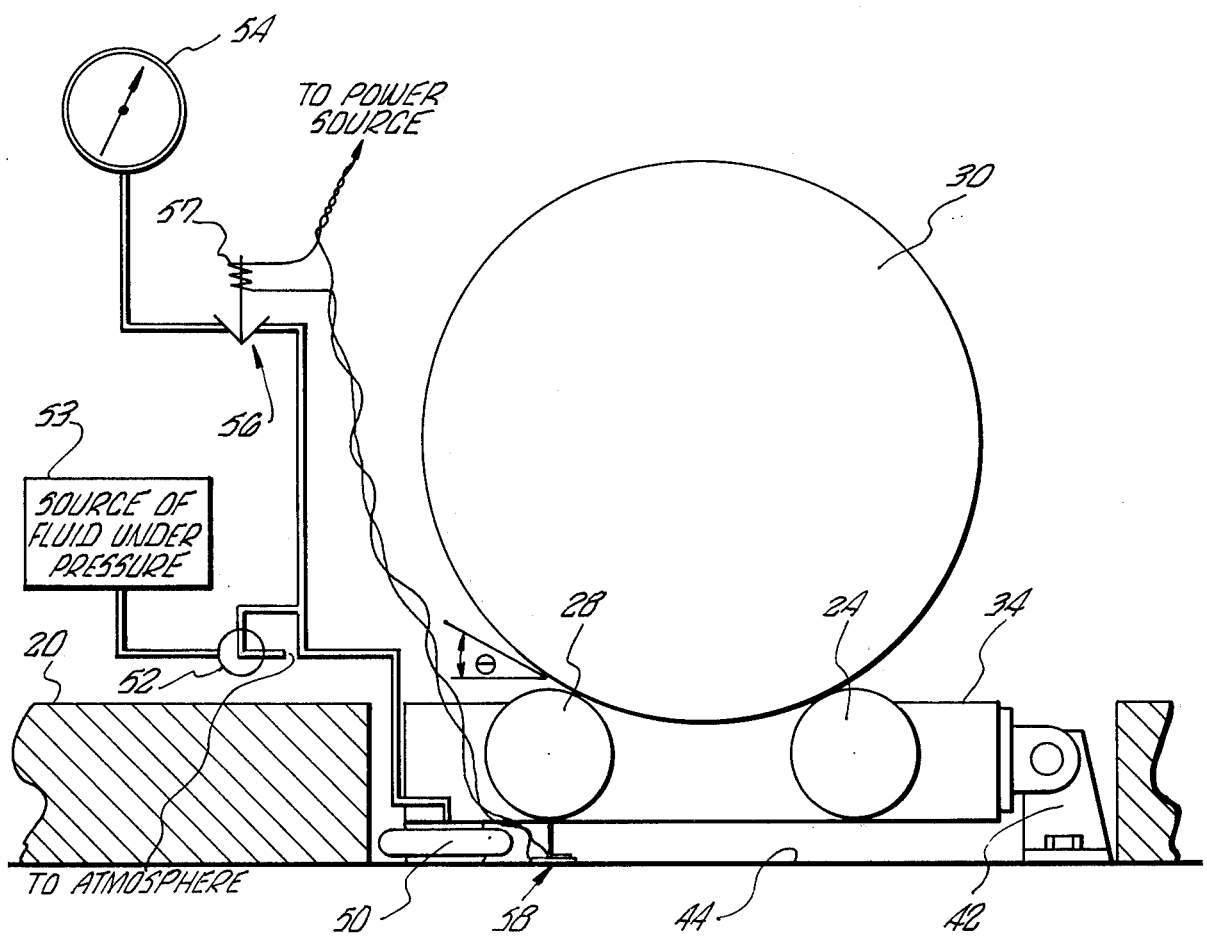
FIG_2_

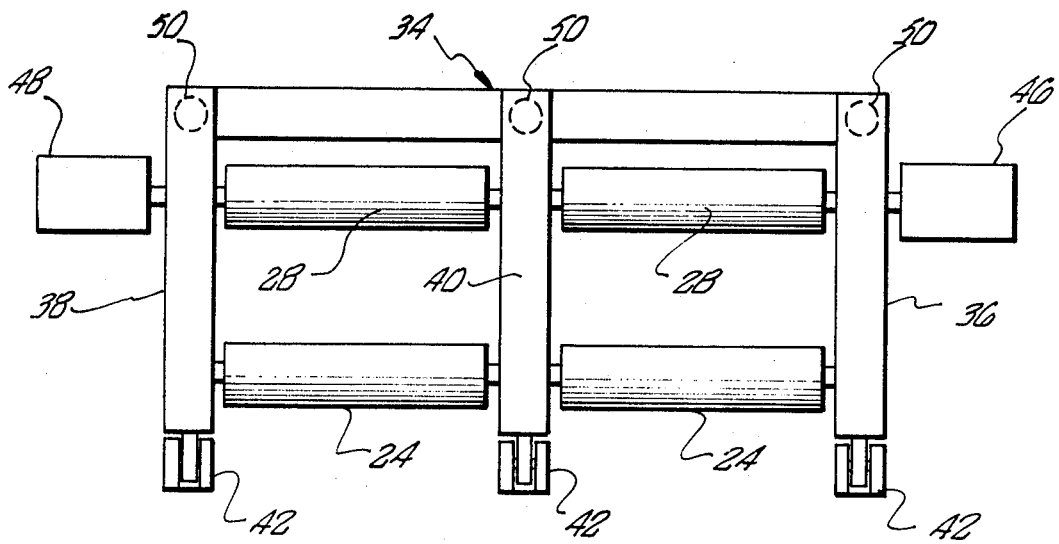
FIG_3_
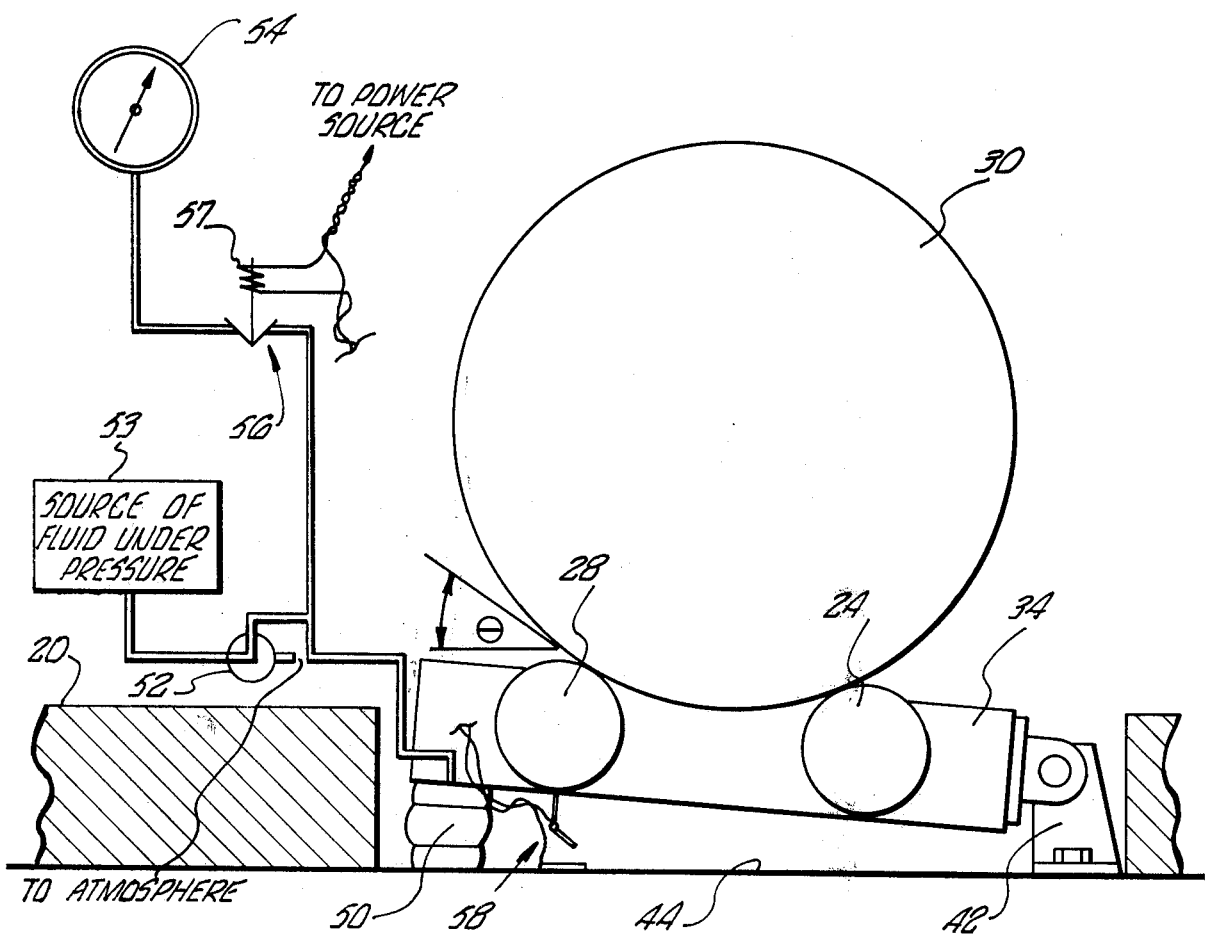
FIG_4_

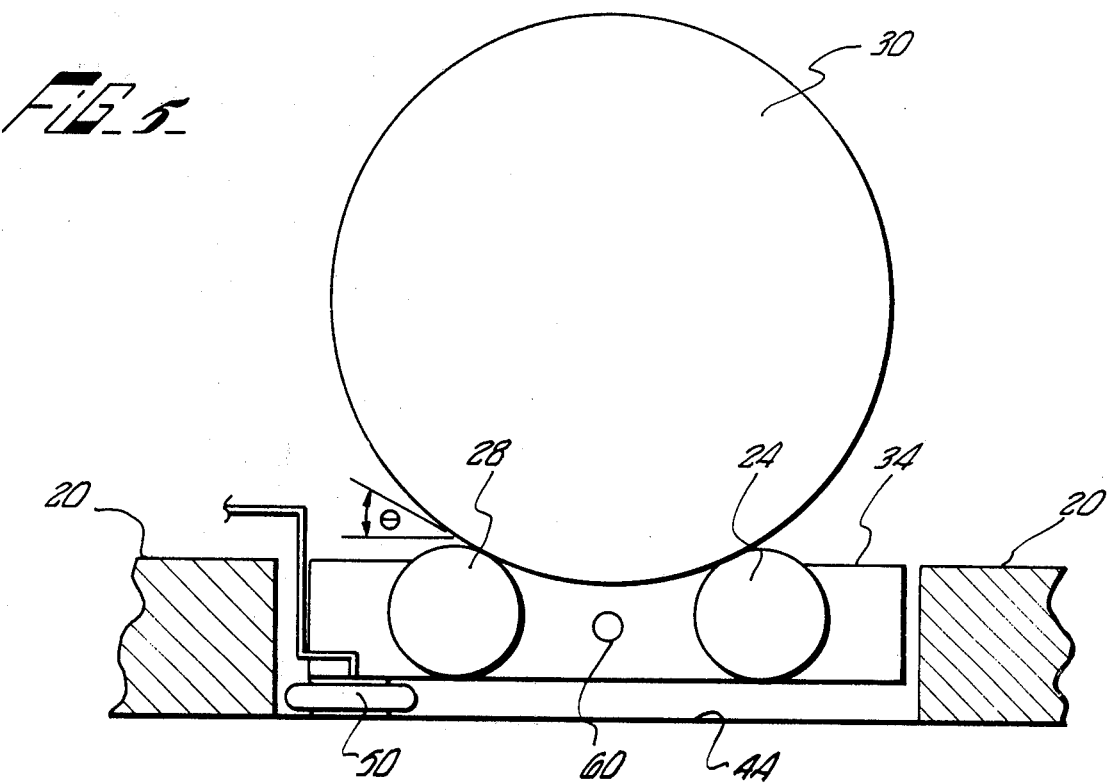
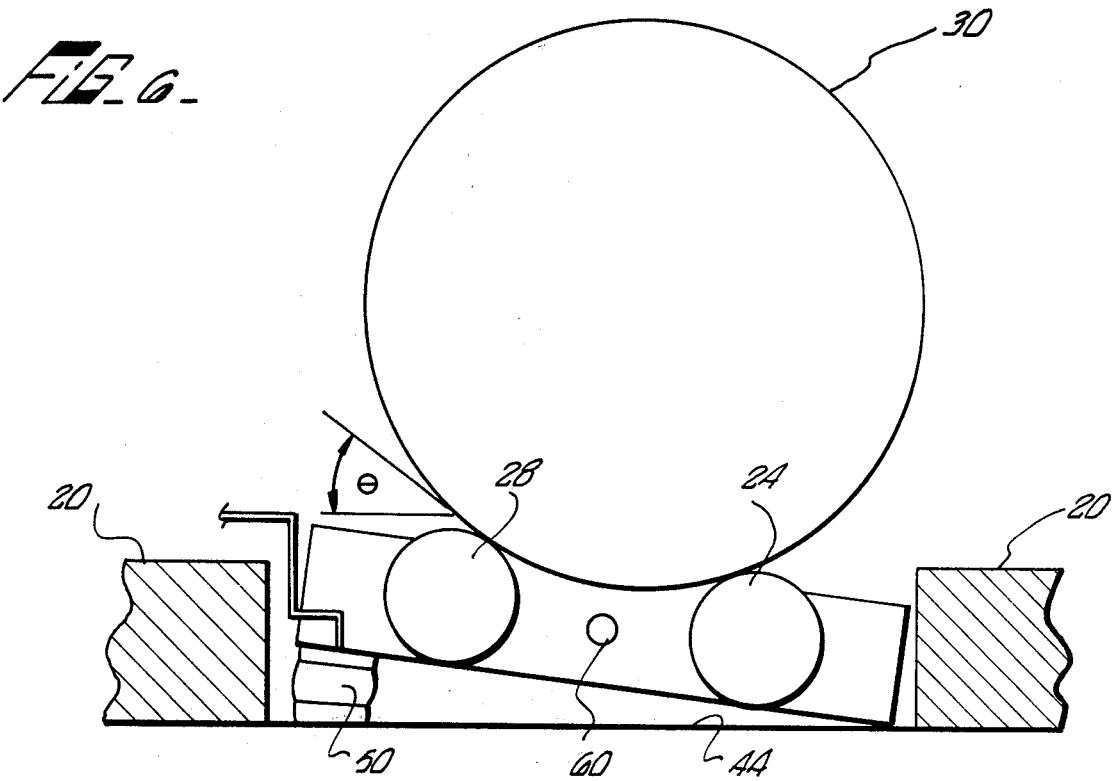

ROLLER BRAKE TESTER

BACKGROUND OF THE INVENTION

1. Field of the Invention

The present invention is directed to brake testing apparatus and particularly to a roller type brake testing apparatus.

2. Description of the Prior Art

Roller type brake testers conventionally include two aligned pairs of cradling rollers mounted in a horizontal plane for supporting each wheel of a pair of front or rear vehicle wheels. A separate prime mover such as an electric motor is connected to one roller of each pair of rollers for driving the pair of wheels supported on the cradling rollers at various speeds. When the vehicle wheel brakes are actuated to apply braking force, the value of the braking force is conventionally measured by measuring the torque applied by the driving motors.

The driving motors are conventionally connected to the roller of each pair which engages the rear portion of the wheel. As the wheel brakes are actuated the reaction force between the wheel surface and the driving roller is in a rearward direction which tends to force the vehicle off of the rear of driving rollers. The angle between a horizontal plane and a tangent to the central contact area between the wheels and the rear rollers is sometimes referred to as the pull out angle. The greater the pull out angle, the greater the torque that can be applied to the vehicle wheel while maintaining the vehicle wheel positioned on the cradling rolls.

The pull out angle and hence the torque that can be applied to the wheels under test can be increased by increasing the spacing between the cradling rollers or by raising the rear cradling roller relative to the front cradling roller.

The size of the vehicle wheels to be tested limits the maximum spacing between the front and rear rollers. As the spacing between the front and rear rollers is increased the static force between the rollers and the wheels increase for any given size of wheels. Thus, the spacing between the rollers is a compromise between the desired pull out angle and the sizes of the wheels to be tested. The spacing is normally fixed for any given brake tester.

To provide a larger pull out angle for a given roller spacing, prior art devices have been constructed with the rear cradling roller mounted at a higher elevation than the front cradling roller. Such a configuration, however, makes it difficult to position the wheels and particularly the front wheels of a vehicle on the cradling rollers because the wheels must be forced up and over the raised rollers. It is also difficult to remove the wheels from such a brake tester where the installation requires that the vehicle be removed by backing out of the tester. Under vehicle clearances are frequently small, particularly between the front and rear axle. Thus, when the vehicle is moved across the elevated roller type tester interference may occur between the tester and the vehicle. To overcome this problem the elevation of the rollers must be minimal, thus compromising the pull out angle.

The present invention overcomes many of the shortcomings of the prior art brake testers by providing a small pull out angle when the vehicle wheels are to be positioned on the cradling rollers and a large pull out angle when the wheel brakes are to be tested to permit (1) the vehicle to be readily driven onto and off of the rollers, and (2) a high torque to be applied to the wheels under test.

SUMMARY OF THE INVENTION

The brake tester of the present invention is provided with wheel support means including first and second rotatable members for supporting and rotating a pair of vehicle wheels the brakes of which are to be tested. The brake tester includes means such as a suitable lift mechanism for selectively raising and lowering the first rotatable member to permit the vehicle wheels to readily pass over the first rotatable member in its lowered position and to restrain the vehicle wheels from traveling over the first rotatable member in its raised position.

BRIEF DESCRIPTION OF THE DRAWINGS

FIG. 1 is a cross-sectional view of a prior art roller brake tester;

FIG. 2 is a cross-sectional view of a brake tester constructed in accordance with the present invention;

FIG. 3 is a plan view of the apparatus of FIG. 2;

FIG. 4 is a cross-sectional view of the apparatus of FIGS. 1 and 2 with the rear cradling rollers in the raised position;

FIG. 5 is a cross-sectional view of another embodiment of the present invention with the cradling rollers in a substantially level position; and FIG. 6 is a cross-sectional view of the apparatus of FIG. 5 with the rear cradling rollers in the raised position.

DESCRIPTION OF THE PREFERRED EMBODIMENT

Referring now to the drawings and more particularly to FIG. 1, there is illustrated a cross-sectional view of a prior art type roller brake tester in which a vehicle wheel 10 is supported on a pair of front and rear aligned cradling rollers 12 and 14, respectively. Only one roller of each pair is illustrated in FIG. 1. The rollers are supported on a frame 16 in a conventional manner. The frame 16 is supported with respect to a suitable driving surface such as a garage floor to permit a vehicle to be driven on and off of the rollers. Conventional means (not shown) such as electric motors are provided for rotating the rear cradling rollers or both the front and rear rollers 12 and 14, respectively, to apply torque thereto against which the vehicle brakes react. A vector 18 represents the reaction force between the rear cradling rollers 14 and the vehicle wheels during application of the brakes. The pull out angle $\theta$ is measured between the vector 18 and the horizontal plane as illustrated.

Referring now to FIGS. 2, 3 and 4, there is illustrated a cross-sectional view of a brake tester in accordance with the present invention which includes a pair of parallel aligned front cradling rollers 24 and a pair of parallel aligned rear cradling rollers 28 which are provided for supporting and rotating a pair of wheels 30 of a motor vehicle. The cradling rollers 24 and 28 are rotatably mounted in a frame 34. The frame 34 includes a pair of end struts 36 and 38 and a central strut 40. The struts 36, 38 and 40 are pivotally mounted on vertical posts 42. As illustrated, the vertical posts 42 are bolted to a support 44 which is secured to a surface such as a garage floor 20. A pair of electric driving motors 46 and 48 are coupled to the rear driving rollers 28 as illustrated in FIG. 3 to provide the driving torque to these rollers.

The torque supplied to the driving rollers is measured by conventional means (not shown) such as pneumatic transducers, etc. One example of such a transducer is illustrated in U.S. Pat. No. 3,504,537.

The rear cradling rollers 28 are selectively (1) raised to an elevation above the front cradling rollers 24 to increase the pull out angle and (2) lowered to the same elevation of the front cradling rollers to permit the vehicle wheels to be readily driven on and off of the rollers by three penumatic bellows 50. For example, the rear cradling rollers may be typically raised three to four inches above the front cradling rollers. The desired difference in elevation between the front and rear cradling rollers will depend upon the spacing between the rollers and other factors. The bellows 50 are disposed between the support surface 44 and the rear portion of the frame 34 to raise the rear end of the frame 34 as is shown in FIG. 4. The pneumatic bellows 50 are connected to a source of fluid under pressure or to atmosphere through a three way valve 52. A suitable pressure gauge 54 is also connected to the pneumatic bellows 50 via a solenoid valve 56. A switch 58 is connected in series with a source of electrical power (not shown) and the armature winding 57 of the solenoid valve 56 to deenergize the solenoid valve 56 when the rear portion of the frame 34 has been lifted a predetermined distance, for example, one-fourth inches. The switch 58 includes a moveable contact carried by the frame 34 and the stationary contact carried on the support surface 44 as illustrated.

In operation the vehicle wheels, the brakes of which are to be tested, are driven onto the cradling rollers when the bellows 50 is in the deflated condition. The valve 52 is then turned to connect a source of fluid (i.e., air) under pressure 53 to the bellows 50. When the bellows 50 has raised the rear portion of the frame 34 a predetermined distance, i.e., a fraction of an inch, the switch 58 opens its contacts which closes valve 56 so that the fluid pressure in the gauge 54 is trapped. The trapped pressure is a measure of axle weight and may be used to calculate the desired brake effort per wheel or axle to be applied during the braking test. For example, 0.6 of the axle weight has been used as the maximum brake effort of both wheel brakes in some prior art tests. If desired the gauge 54 may be calibrated to provide a reading of axle weight or the maximum brake effort which is to be achieved during the braking test. The gauge 54 or an additional gauge may also be calibrated to indicate the maximum acceptable imbalance between the two wheel brakes being tested. An electrical read out instrument such as a digital meter may be substituted for the gauge 54 with proper pressure to electric transducers if desired.

The fluid under pressure from sources 53 continues to inflate the bellows 50 until the rear portion of the frame has been raised a preset distance, e.g., 3 or 4 inches. A limit stop (not shown) may be used to limit the upward movement of the frame 34.

With the rear cradling rollers 28 in the raised position the motors 46 and 48 are brought up to speed and the vehicle brakes are applied. At the conclusion of the brake test, the valve 52 is turned to vent the bellows 50 to atmosphere. The rear portion of the frame 34 drops until the rear and front cradling rollers are level. As the frame 34 drops the contacts of the switch 58 are made. These contacts energize the valve 56 via the power source and thereby vent the gauge 54 to atmosphere.

Referring now to FIGS. 5 and 6, there is illustrated another embodiment of the present invention in which the frame 34 which carries the cradling rollers is pivotally mounted on an axle 60 located approximately midway between the cradling rollers. The bellows 50 may be used to tilt the frame 34 after the vehicle wheels are positioned thereon as is illustrated in FIG. 6 to increase the pull out angle and thus permit an increased braking torque to be applied to the vehicle wheels. The frame 34 in FIGs. 5 and 6 may be constructed as shown in FIG. 3 with the axle 60 being rotatably mounted in the strut 36, 38 and 40 and being secured to the support surface in a suitable manner.

There has thus been described a roller type brake tester which includes means for selectively raising and lowering the rear cradling roller to permit a high torque to be applied to the vehicle wheels under test when the rear roller is in its raised position and to permit the vehicle wheels to be readily driven on and off of the rollers when the rear roller is in its lowered position. While a penumatic bellows has been illustrated as the mechanism for lifting the frame 34, other types of conventional lift mechanisms such as pneumatic or hydraulic cylinders could be used for lifting the rear portion of the frame 34. Various modifications of the apparatus will be apparent to those skilled in the art without departing from the spirit of the invention.

It is claimed:

1. In a roller brake tester for testing a pair of wheel brakes of a motor vehicle, the combination which comprises:
   wheel support means including a frame and pair of aligned rear cradling rollers and a pair of aligned front cradling rollers mounted in the frame for supporting and rotating the pair of vehicle wheels, the rear cradling rollers being arranged to engage the rear portion of the wheels, and the front cradling rollers being arranged to engage the front portion of the wheels, the frame being pivotally mounted with respect to a support surface at a location between the front and rear cradling rollers; and
   means for selectively raising and lowering the pair of rear cradling rollers relative to the front cradling rollers when a pair of vehicle wheels are positioned thereon to restrain the wheels from traveling back over the rear cradling rollers in their raised position and to permit the vehicle wheels to readily be driven off and on of the rear cradling rollers in their lowered position.

2. The combination as defined in claim 1 wherein the means for selectively raising and lowering the rear cradling rollers includes at least one fluid operated lift mechanism for selectively raising and lowering the frame adjacent the rear cradling rollers.

3. The combination as defined in claim 2 including means coupled to the fluid lift mechanism for displaying a measure of the weight supported by the wheels when the lift mechanism is raised above its lowered position.

4. In a roller brake tester for testing the wheel brakes of motor vehicles, the combination which comprises:
   wheel support means including a frame and first and second rotatable members carried by the frame for supporting and rotating each of the wheels to be tested, the frame being pivotally mounted at a location between the first and second rotatable members; and means for selectively changing the relative elevation of the first and second rotatable members from substantially equal elevations to unequal elevations when a pair of vehicle wheels are positioned thereon so that the elevation of the first rotatable member is higher than the second rotatable member to permit the vehicle wheels to readily pass over the rotatable members when their elevations are substantially equal and to restrain the vehicle wheels from traveling over the first rotatable member when the elevation of the rear rotatable member is higher than the second rotatable member.

5. In a roller brake tester for testing a pair of wheel brakes of a motor vehicle, the combination which comprises:

a frame pivotally mounted with respect to support surface;

wheel support means carried by the frame including a pair of aligned rear cradling rollers and a pair of aligned front cradling rollers for supporting and rotating the pair of vehicle wheels, the rear cradling rollers being arranged to engage the rear portion of the wheels, and the front cradling rollers being arranged to engage the front portion of the wheels;

means for selectively raising and lowering the one end of the frame about its pivotal mounting to thereby raise and lower the pair of rear cradling rollers relative to the front cradling rollers when a pair of vehicle wheels are positioned thereon to restrain the wheels from traveling back over the rear cradling rollers in their raised position and to permit the vehicle wheels to readily be driven off and on of the rear cradling rollers in their lowered position; and measuring means coupled to the frame for providing a visual indication indicative of a value which is proportional to the weight supported by the cradling rollers when the cradling rollers are at rest, the measuring means being arranged to maintain the visual indication of said value during rotation of the vehicle wheels by the cradling rollers to test the vehicle brakes.

6. The combination as defined in claim 5 wherein the measuring means is arranged to provide a visual indication of the weight supported by the cradling rollers.

7. The combination as defined in claim 5 wherein the measuring means is arranged to provide an indication of the maximum brake effort to be achieved during the brake test.

8. The combination as defined in claim 5 wherein the measuring means is arranged to provide an indication of the maximum acceptable imbalance between the two wheel brakes under test.

9. In a roller brake test for testing a pair of wheel brakes of a motor vehicle, the combination which comprises:

a frame;

means for pivotally mounting the frame with respect to a support surface;

a pair of aligned rear cradling rollers and a pair of aligned front cradling rollers rotatably mounted on the frame for supporting and rotating the pair of vehicle wheels, the rear cradling rollers being arranged to engage the rear portion of the wheels, and the front cradling rollers being arranged to engage the front portions of the wheels;

means for rotating at least one of each pair of cradling rollers to rotate the vehicle wheels while the wheel brakes are being applied; and measuring means coupled to the frame and the support surface for providing a visual indication of a value which is proportional to the weight supported by the cradling rollers when the cradling rollers are at rest, the measuring means being arranged to maintain the visual indication of said value during rotation of the vehicle wheels by the cradling rollers to test the wheel brakes.

10. The combination as defined in claim 9 wherein the measuring means is arranged to provide a visual indication of the weight supported by the cradling rollers.

11. The combination as defined in claim 9 wherein the measuring means is arranged to provide an indication of the maximum brake effort to be achieved during the brake test.

12. The combination as defined in claim 9 wherein the measuring means is arranged to provide an indication of the maximum acceptable imbalance between the two wheel brakes under test.

* * * * *